United States Patent
Reichert et al.

(10) Patent No.: US 7,330,242 B2
(45) Date of Patent: Feb. 12, 2008

(54) SYSTEM FOR RECORDING AN OBJECT SPACE

(75) Inventors: Rainer Reichert, Horn (AT); Johannes Riegl, Irnfritz (AT); Andreas Stoeger, Moedring (AT); Rolf Lamm, Aachen (DE); Andreas Ullrich, Gablitz (AT)

(73) Assignees: Riegl Laser Measurement System GmbH, Horn (AT); Ferrotron Technologies GmbH, Moers (DE)

( * ) Notice: Subject to any disclaimer, the term of this patent is extended or adjusted under 35 U.S.C. 154(b) by 0 days.

(21) Appl. No.: 11/437,645

(22) Filed: May 22, 2006

(65) Prior Publication Data

US 2007/0058154 A1    Mar. 15, 2007

Related U.S. Application Data

(63) Continuation of application No. PCT/IB2004/003765, filed on Nov. 15, 2004.

(30) Foreign Application Priority Data

Nov. 21, 2003  (AT) .............................. A 1877/2003

(51) Int. Cl.
    *G01C 3/08*    (2006.01)
(52) U.S. Cl. ..................... 356/4.01; 356/5.01; 359/838
(58) Field of Classification Search ...... 356/4.01–5.15, 356/28, 337, 342; 359/399, 419, 834, 838
    See application file for complete search history.

(56) References Cited

U.S. PATENT DOCUMENTS 3,544,797 A    12/1970   Fruengel (Continued)

FOREIGN PATENT DOCUMENTS

DE    3408082 A1    9/1985

(Continued)

OTHER PUBLICATIONS

WO 2005/050129 A3—Search Report dated Jun. 8, 2005.

(Continued)

*Primary Examiner*—Isam Alsomiri
(74) *Attorney, Agent, or Firm*—Buchanan Ingersoll & Rooney PC

(57) ABSTRACT

A system for recording an object space has a opto-electronic distance sensor which uses a signal propagation time method, and a transmitter for transmitting optical, signals, as well as a receiver (E) for receiving optical signals, reflected by objects located in the target space. The system comprises a scanner for deflecting optical axes of the transmitter and receiver (S and E). The optical axes of the transmitter and receiver (S and E) for example, are substantially parallel. An evaluation system determines distance values from the propagation time or phase position of the transmittal optical signals, and the space coordinates of the individual data elements result from the distance values and the beam deflection implemented by the scanner. The system comprises a rotary measurement head mounted on a pillow block, and a mirror system fixed relative to the measurement head, which deflects beams axially incident on the hollow shaft in the radial direction and vice versa. The radiation from stationary transmitter (S) can be introduced in the axial direction relative to the hollow shaft and can be transmitted in the radial direction through the mirror system. The radiation reflected by the targets located in the object space, can be deflected by the mirror system in the direction of the axis of the hollow shaft and be supplied to the receiver (E), which is also stationary.

36 Claims, 4 Drawing Sheets

U.S. PATENT DOCUMENTS

| | | | |
|---|---|---|---|
| 3,793,958 A * | 2/1974 | Holt et al. ............. 102/213 |
| 4,024,392 A | 5/1977 | Teppo et al. |
| 4,107,244 A | 8/1978 | Ochiai et al. |
| 4,159,169 A * | 6/1979 | Sato ..................... 396/111 |
| 5,125,745 A | 6/1992 | Neiheisel et al. |
| 5,212,738 A | 5/1993 | Chande et al. |
| 5,425,279 A | 6/1995 | Clark et al. |
| 6,559,933 B1 * | 5/2003 | Kirkpatrick et al. ...... 356/28.5 |
| 2003/0123045 A1 * | 7/2003 | Riegl et al. ............. 356/4.01 |
| 2005/0094134 A1 * | 5/2005 | Hoffman, II ............ 356/139.05 |
| 2005/0168720 A1 * | 8/2005 | Yamashita et al. ........ 356/4.01 |
| 2006/0227316 A1 * | 10/2006 | Gatt ..................... 356/5.09 |

FOREIGN PATENT DOCUMENTS

| | | |
|---|---|---|
| EP | 0 310 244 A2 | 4/1989 |
| WO | 99/13355 | 3/1999 |
| WO | 01/77709 A1 | 10/2001 |
| WO | 02/087819 A1 | 11/2002 |

OTHER PUBLICATIONS

PCT/ISA/206 dated Mar. 3, 2005.
PCT/ISA/210 dated Jun. 8, 2005.

* cited by examiner

SYSTEM FOR RECORDING AN OBJECT SPACE

RELATED APPLICATIONS

The present application is a bypass continuation application which claims priority under 35 U.S.C. §120 to PCT/IB2004/003765 filed on Nov. 15, 2004, which in turn claims priority under 35 U.S.C. §119 to Austrian Application No. A-1877/2003 filed Nov. 21, 2003, the contents of which are hereby incorporated by reference in their entireties.

FIELD

An apparatus for recording an object space is disclosed which includes an opto-electronic range finder operated in accordance with a signal time-of-flight method and including a transmitter unit for transmitting optical signals, such as laser signals, and a receiver unit for receiving optical signals, such as laser radiation, reflected by objects existing in the target space. In order to determine and record three-dimensional structures, such range finders are combined with a scanning device for deviating the optical axes of the transmitter and receiver units, for example, in two orthogonal directions, thus deviating the optical axes extending substantially in parallel. An evaluation unit determines distance values from either the time-of-flight or the phase relationship of the optical signals, and from these distance values and simultaneously detected angle values of the scanning device forms the spatial coordinates of the individual data elements. A method for recording an object space, is also disclosed.

BACKGROUND

Known devices are used for measuring buildings, ground structures, machines and plants etc. In general, these systems comprise a measuring head wherein a measuring beam is deviated at a high speed and in a fan-like manner by a limited angle of e.g. 90°. Deviation of the measuring beam is achieved by pivoting mirrors, rotating mirror wheels or the like. The measuring head is often mounted on a turntable which performs a relative slow movement to and fro. The pivoting angle is, according to the application, typically in a range of 90° to 180°.

These systems are used in a restricted way, if a substantially complete spatial angle has to be recorded. Such applications are, for example, when measuring inner rooms of buildings, when measuring caverns, caves, when excavating tunnels or mines etc. Applications under especially difficult conditions are in steel industry when measuring converters and transport vessels for molten pig iron or steel.

For operative and energetic reasons, molten metals are often transported from a place of production to a processing place. In steel industry, appropriate vessels, so-called torpedo ladles, are used to bring liquid pig iron from a blast furnace to a converter and, optionally, from it to a foundry, particularly to continuous casting machines, where slabs are cast as a starting material for mill processing. These torpedo ladles, which are able to contain several hundred of tons of iron melt or steel melt, have a lining which constitutes a thermal isolation and, at the same time, protects the steel jacket of the vessel against the action of the melt. As in steel converters, linings of such torpedo ladles are subjected to wear, and the result can be, in particular, that individual bricks of the lining break out. Since such damage can seriously affect the security and the environment, the lining of this transport equipment has to be inspected, repaired or replaced on a regular basis which, of course, causes high expenses. When carrying out such an inspection, the torpedo ladle (or any other vessel for steel or iron) has to be cooled down and, afterwards, has to be heated slowly up to working temperature (~1300° C.). This results in a considerable interruption of operation that causes correspondingly high costs.

SUMMARY

An apparatus is disclosed which can provide precise measurement of an inner space of a vessel. By referential recordings before the initial operation (the data being stored in a memory) and by forming the difference with the respective actual recording, changes of the lining, as by wear and breaking out of bricks, can be determined in an exact manner. Thus, repair of the lining can be carried out only when actually necessary.

In an exemplary embodiment, a rotating measuring head supported on a pedestal. A mirror unit, arranged in a stationary fashion with respect to the measuring head, is provided by which axially incident beams, in relation to the hollow shaft, are deviated in radial direction and vice-versa, wherein radiation of a stationary transmitter unit may be lead in axial direction, in relation to the hollow shaft, and may be transmitted in radial direction by the mirror unit. Radiation reflected from targets in the object space can be deviated by the mirror unit in the direction of the axis of the hollow shaft and fed to the receiver unit which is also stationary arranged.

The mirror unit can be formed in various ways, for example by one or more mirrors and/or by completely or partially reflecting prisms. For example with a coaxial arrangement at an optical system common to the transmitter channel and the receiver channel, dividing these channels could be effected e.g. by a partially transparent mirror, a single mirror or a corresponding prism being sufficient. In an alternate embodiment, the apparatus comprises a rotating measuring head driven by a motor and located between the legs of a pedestal and supported on a hollow shaft, wherein two mirrors are fixed within the measuring head in axial direction in relation to the hollow shaft, a first mirror deviating the beams of the transmitter unit, or of an optionally interposed light guide, entering in axial direction through the hollow shaft, in radial direction in relation to the hollow shaft, and transmits them, (for example, after beam shaping), while the second mirror deviates beams substantially incident parallel to the transmitter beam and reflected by targets within the object space, (for example, after beam shaping), in axial direction in relation to the hollow shaft, towards to receiver unit, via an optional interposed light guide.

In an exemplary embodiment, the pedestal is mounted on any suitable turntable, which is pivotal about an axis extending perpendicularly to the axis of rotation of the measuring head and is driven by a motor.

In order to enable access of the measuring system to hollow spaces through narrow channels, e.g. the filler neck of a vessel, the turntable is, according to an exemplary embodiment, mounted on a cylindrical, support tube, the pivoting axis of the turntable being oriented parallel to the axis of the support tube and is, for example, identical with it.

When inspecting torpedo ladles or other vessels for molten metal, particularly those for liquid pig iron or steel, appropriate measurements can be affected substantially at operation temperatures, and it is not required to specially cool the vessels. The pedestal and/or the support tube or the measuring head can comprise a cooling arrangement to this end, such as by liquid, and/or is provided with a thermal isolation. Supply and discharge of cooling liquid for the pedestal and/or the support tube can be effected through hose conduits guided within the interior of the support tube.

In this way, it is possible for the first time by this cooling arrangement and/or this isolation to economize costs for cooling the vessels and a corresponding rest period. This (these) measure(s), independent from the construction and the arrangement of the mirror unit and the rotation of the measuring head, is also inventive. Those skilled in the art strived up to now to arrange the measuring head outside the vessel to be measured which made orientation measures with respect to the vessel necessary.

In an exemplary embodiment, the measuring head may be cooled, either in addition or as an alternative, by means of a gas (including the gas of an evaporating cooling medium, such as Freon), such as by air under pressure, the gas being, for example, introduced into the measuring head through one side of the hollow shaft, and discharged through the other side from it. The gas supply can be effected through a hose conduit in the interior of the support tube, while the gas may be discharged through the support tube.

In order to protect the rotatably supported measuring head, and the windows of the range finder system, which lead in and out, against blinding and damaging, when introducing the measuring apparatus through the narrow channel, the outer contour of the measuring head in inoperative position, in which the windows leading the measuring beams in and out are oriented towards the turntable, can be adapted to the contour of the pedestal. Together they can form, for example, the shape of a spherical calotte or the like.

Additionally, protection of the measuring system can be achieved. The pedestal and the measuring head in inoperative position can have a stepped diameter towards the support tube, a second tube being displaceable in longitudinal direction on the support tube so as to be shiftable over the regions of stepped diameter of the pedestal and the measuring head in inoperative position and to close the pedestal, the turntable and the measuring head in a substantially tight manner.

The support tube together with the pedestal and the measuring head can be arranged on a carriage which may be moved into a defined and reproduceable position relative to the object to be measured.

Exemplary embodiments can be used to measure and inspect vessels and tank wagons for aggressive liquids, such as for molten metal.

Whenever the measuring beams emerge substantially in radial direction from the measuring head, shadowing in a region around the support tube or the like can occur due to the pedestal and the turntable. Since the measuring system can be introduced through the filling neck of the vessel into it, the measuring system is "blind" in the region around the filling neck wherein the melt flows with high velocity of flow when charging and/or discharging, for which reason one has to expect there the phenomenon of highest wear. In order to avoid shadowing and to be able to measure in this region in a designated critical region mirror can be arranged before each window that leads the measuring beams in and out, the mirror deviating the measuring beams, in relation to the measuring head, in a substantially tangential direction.

A method is disclosed in which the following steps are provided:

(a) providing an elongated measuring arrangement having a longitudinal axis;
(b) introducing the elongated measuring arrangement into the cavity of a vessel for molten metal, the cavity being defined by an inner wall;
(c) rotating the measuring head of the measuring arrangement about the longitudinal axis;
(d) measuring the distance of the measuring arrangement to the inner wall while rotating the measuring arrangement about the longitudinal axis; and
(e) optionally storing the measured distance data.

When doing this, collecting data can be effected such that the data obtained by steps (c) and (d) are combined to form a three-dimensional image of the cavity of the vessel prior to step (e).

In addition or as an alternative, reference data to the measured data can be stored, for example, as a three-dimensional image, and these reference data can be compared with the measured data after having effected step (d) of the method.

BRIEF DESCRIPTION OF THE DRAWINGS

Further characteristics will be apparent from the following description of exemplary embodiments with reference to the drawings.

DETAILED DESCRIPTION OF THE DRAWINGS

Figure 1:
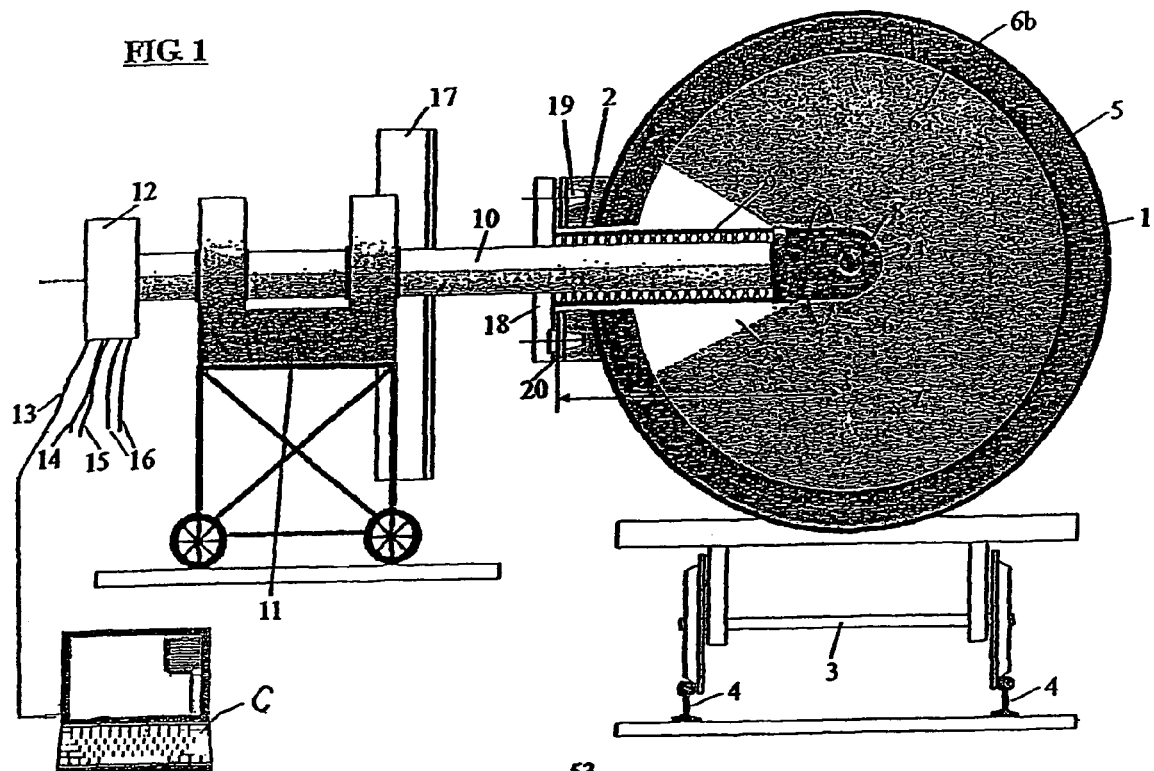
FIG. 1 shows schematically an exemplary apparatus for measuring a so-called torpedo ladle.

In FIG. 1, a torpedo ladle is schematically illustrated in a cross-sectional view and is referenced 1. An exemplary torpedo ladle comprises a cylindrical center portion having a filling and emptying neck 2. On both sides conical portions join the center portion and end in a shaft end on which the ladle is rotatably supported. The two bearings prop each on a bogie which rolls on rails. The axis 3 of such a bogie and the rails 4 are schematically indicated. The torpedo ladle 1 has a steel jacket 5. The inner space has a lining 6 which can include (e.g., consist on of two layers, i.e. an inner wear layer 6a and an outer security lining 6b. One of the conical portions of the ladle is referenced 7. In order to fill the torpedo ladle 1, it is, starting form the position shown in FIG. 1, pivoted by 90° in clockwise sense so that the filling neck 2 is upwards directed, while for emptying, the ladle is rotated by 180°. The intermediate position shown in FIG. 1 is assumed after emptying for inspecting the lining.

Figure 4A:
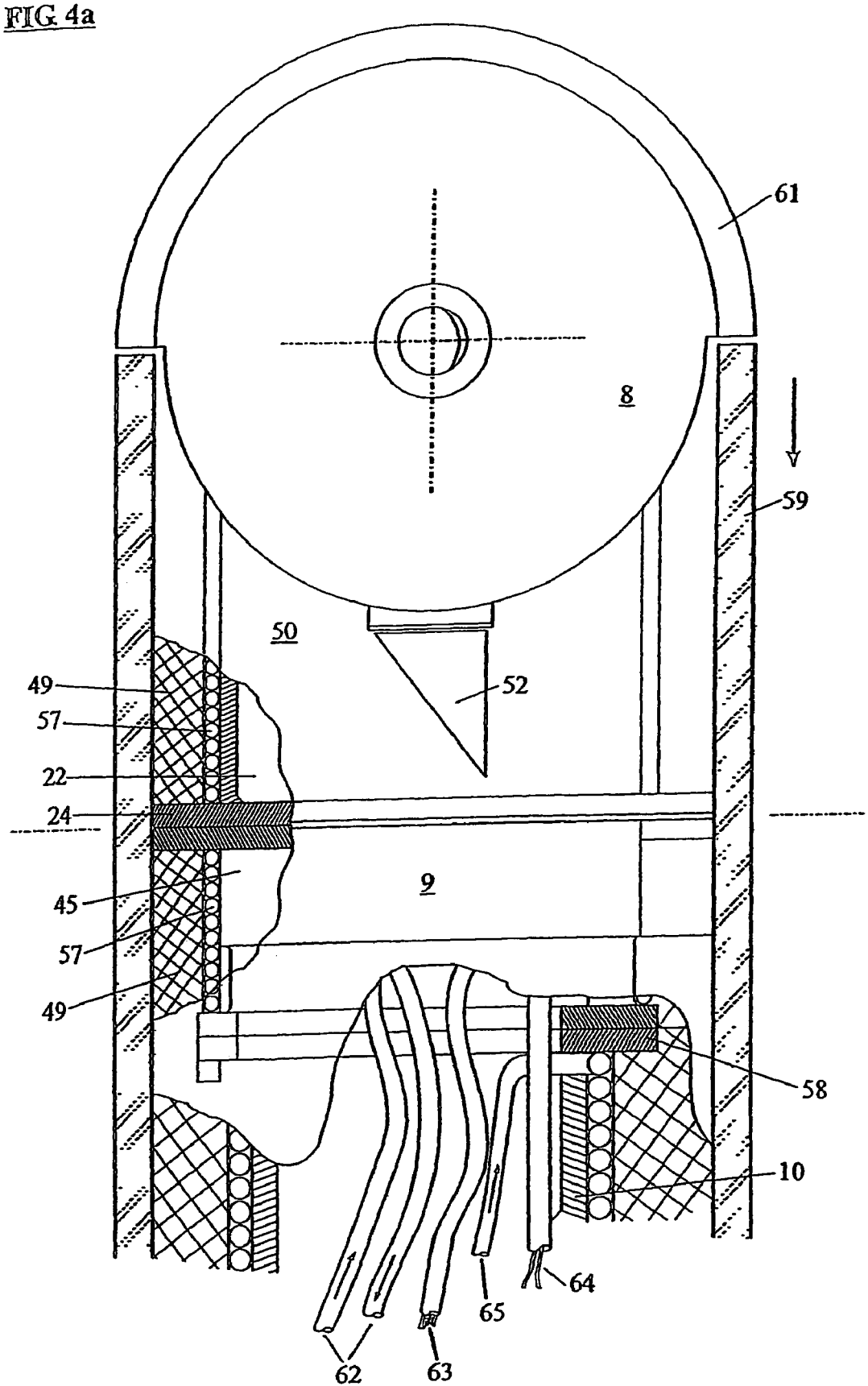
FIG. 4a shows an exemplary measuring apparatus, partially in cross-section, partially in elevation.

For inspecting the torpedo ladle 1, a measuring head 8 is introduced into the emptied ladle through the filling neck 2. The measuring head 8 is situated in a tube 9, cooled by a liquid, whose elongation 10 is displaceably supported in a carriage 11. At the free end of the tube 10 is a housing which contains the electronics of a laser range finder and the control unit of the scanning device of the measuring head 8. In the interior of the tube 9, 10, data cables, control cables and energy cables are lead to the measuring head 8. The laser transmitter or transmitting station S, the opto-electronic receiver E for the laser's echo pulses and the entire evaluation unit coupled to them are arranged within the housing 12, and are coupled to the measuring head 8 by means of a glass fiber cable 64 (FIG. 4a). Correspondingly, the evaluation unit can be referenced 12.

Within the interior of the tube 9, 19, conduits for a cooling medium and/or a pressurized air conduit for cooling the proper measuring head 8 are also led. The whole installation can be controlled by a control and data cable 13 which is connected to an electronic calculator C which, in turn, calculates either on-line or off-line a 3-D model of the interior of the vessel 1 from the measured data determined by the evaluating unit 12, as is known per se, and also stores it suitably in an affiliated memory. An energy cable 14 is referenced 14, a pressurized air conduit is referenced 15, and supply and discharge conduits for the cooling medium are referenced 16. In order to facilitate introducing the appliance into the filling neck 2 of the torpedo ladle, a radiation protective shield 17 is provided and is fastened to the tube 10. Furthermore, a plate 18 is mounted on the tube 10 and has dowel pins 19 which engage corresponding bores in the covering surface 20 of the filling neck 2, thus orienting the measuring head with respect to the torpedo ladle 1.

It may be convenient to mount the measuring installation consisting of, for example, the measuring head 8, the tube 9, 10 the housing 12, the plate 18 as well as the protective shield 17 on a crane, the suspension being effected at the center of gravity of said installation. With such a modification, the measuring installation can be oriented in a quick and optimum manner with respect to the torpedo ladle 1, if the measuring position thereof has only roughly been adjusted.

Precise orientation of the measuring system at the ladle 1 can, for example, be important when a comparison and formation of the difference between an actual recording and an older recording are desired. Instead of orienting mechanically, it also possible to, for example, orient the system appropriately with respect to the torpedo ladle by measuring reference points.

During measuring, the measuring head 8 rotates between the two legs 21 and 22 of the pedestal in the direction of arrow 23. As may be seen in FIG. 1, a conical region 25 around the tube 9 is shadowed, because the measuring beam impinges the foot portion 24 (FIG. 2) of the measuring apparatus (where the legs 21 and 22 are arranged; see FIGS. 2, 4a) and cannot reach the lining around the filling neck 2. Apart from the region 25, the complete inner space of the torpedo ladle 1 is recorded by rotating the measuring head 8 in the direction of arrow 26. In association to each individual data element, spatial coordinates will result from distance values and the simultaneously determined angle values of the beam deviation through the scanning device. From the totality of all data elements, a 3-D model of the inner space of the ladle 1 can be established. If an older recording of the torpedo ladle 1 exists, any change of the surface of the lining may be calculated by forming the difference. This older recording will be contained in a memory, for example of computer C, and can be compared either directly with arriving measuring data from the measuring head 8 or after intermediate storing in the memory of computer C.

Figure 2:
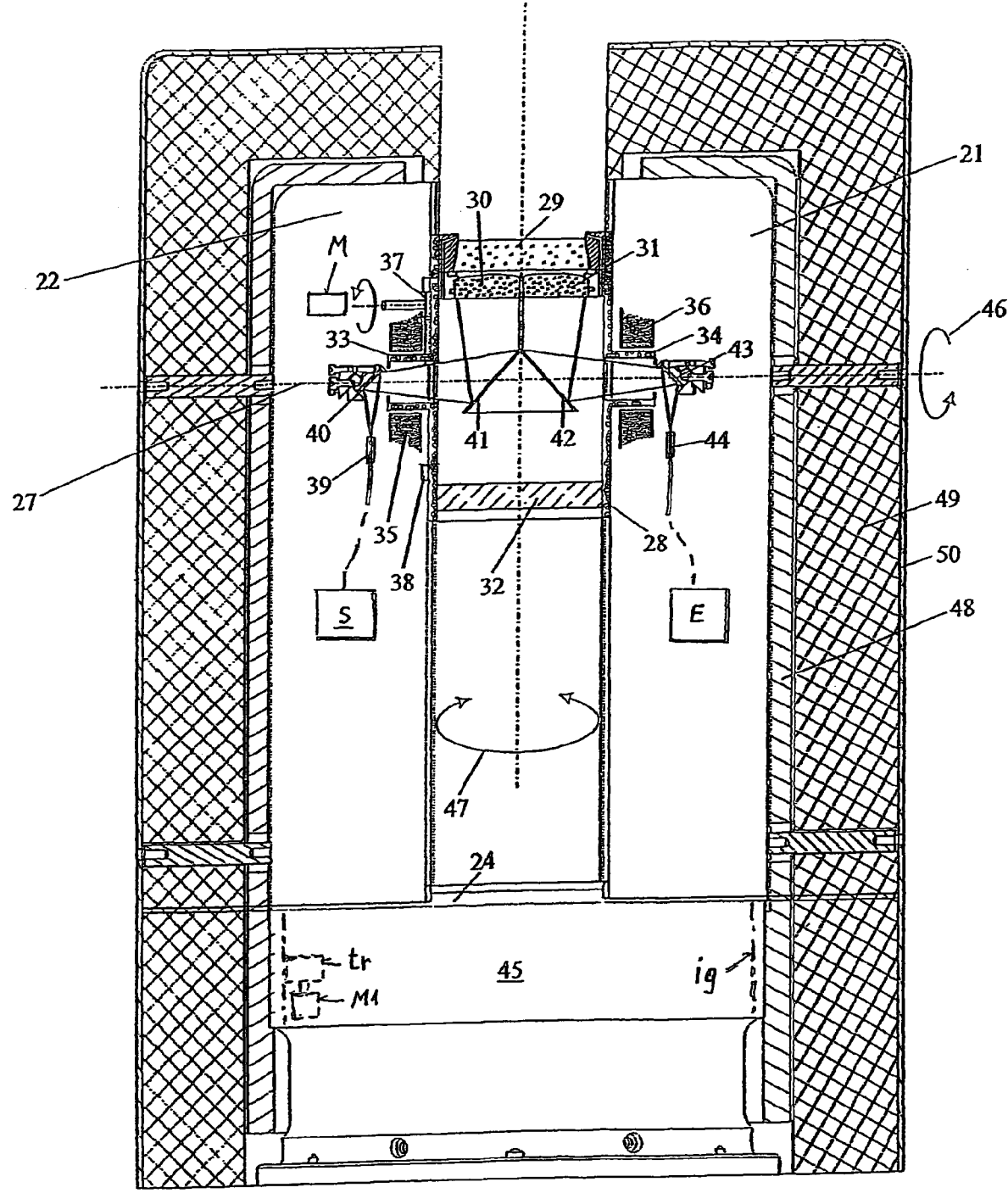
FIG. 2 illustrates an axial cross-section of the measuring head according to an exemplary embodiment including a pedestal and a turntable.

In FIG. 2, the construction of the measuring apparatus is shown in axial cross-section. The measuring head 8 comprises a cylindrical housing 28 with respect to axis 27. In the cylindrical jacket is a substantially rectangular window 29 for the transmitted and received measuring beam. In the housing 28, behind the window 29, there are two lenses 30, 31 for the measuring beams (collimation lens for the transmitted beam and focusing lens for the reflected echo signal). The weight of these glass elements 29 to 31 can be compensated by a counter-weight 32 arranged within the housing 28. The housing 28 can be rotatable about the axis 27. the measuring head 8 is supported on the ends 33, 34 of a hollow shaft. The two shaft ends 33, 34 are supported and guided in schematically indicated bearings 35, 36. The measuring head 8 is driven by a motor M, whose pinion 37 engages an inner gear rim 38 which is coaxially mounted to the hollow shaft at the wall of the housing 28. Alternatively, the measuring head 8 can, for example, be driven by a gear system leading to outside, or optionally also by hand.

When measuring, the measuring head 8 rotates at a number (e.g., relatively high number) of revolutions in the direction of arrow 46. The transmitter radiation is supplied to the measuring head 8 by a glass fiber cable 39. The radiation is directed by a mirror 40 through the hollow shaft in an axial direction into the measuring head and is fed to the collimation lens 30 by a reflecting prism surface 41. The radiation reflected from a target object impinges into the measuring head 8 through the window 29 and is concentrated, after a two-fold deviation at the reflecting prism surface 42 and the mirror 43, by the focusing lens 31 onto the glass fiber cable 44 which directs the echo signals further to the receiver unit of the range finder.

The pedestal 21, 22, 24 and its two legs 21 and 22 are arranged on a turntable 45. The turntable 45 performs a reciprocating movement in the direction of arrows 47. When scanning a complete spatial angle, the angel is at least 180°, preferable 360°. To this end, it is driven in its interior by a toothed roller tr illustrated in dotted lines by a motor M1. The toothed roller tr engages an internal gear ig illustrated in dash-dotted lines.

The two legs 21 and 22 of the pedestal 21, 22, 24 as well as the turntable 45 are surrounded by a liquid cooler 48 and/or an isolating layer 49 which, in turn, is surrounded by a sheet metal jacket 50. Water or even oil may be used as a cooling medium. In the case of an extreme temperature load, the measuring head 8 may, in addition, be equipped with a gas cooling system (e.g. also an evaporating gas, such as Freon) or with pressurized air cooling which, however, may also be applied alone in the case of a smaller temperature load. To this end, in the case of an exemplary embodiment, a pressurized air conduit, can be introduced into one leg 22 of the pedestal 21, 22, 24 which can be connected to the hollow shaft end 33. Pressurized air (or any other gas) can flow at a relatively high velocity through the measuring head 8 and exits from the measuring head 8 through the hollow shaft end 34, then being discharged through the leg 21 of the pedestal 21, 22. In order to obtain an optimum cooling effect by air or gas, guiding plates may be arranged in the interior of the measuring head.

If the measuring beams, as in the above embodiment, emerge in radial direction from the measuring head and enter it in radial direction, a relatively large spatial angle 25 can result which is shadowed, i.e. the measuring beams do not reach it, because they are shielded by the base 24 of the pedestal 21, 22, 24 and the turntable 45.

Figure 3:
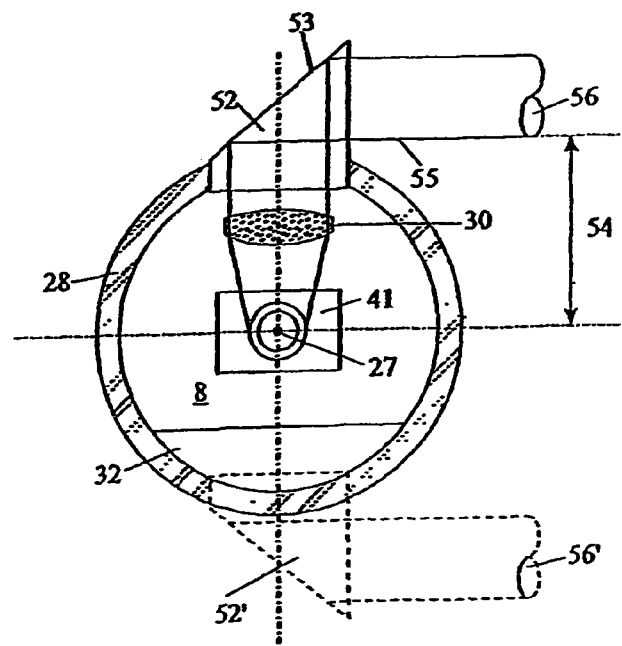
FIG. 3 in a schematic way, shows an exemplary detail of a measuring head in a transverse cross-sectional view.

FIG. 3 shows schematically a solution by which the shadowing effect can be decreased or, with an appropriate construction of the measuring head, can be totally avoided. A prism 52 is provided instead of the window 29, the surface 53 thereof being made reflective. Measuring beams in this embodiment of the measuring head do not enter into and emerge from it in radial direction, but substantially tangentially. If the prism 52 is constructed in such a manner that the distance 54 of the inner delimitation 55 of the bundle of measuring rays 56 corresponds at least to the radius of the basis 24 of the pedestal 21, 22, 24 or of the turntable 45, no shadowing effect will occur. When the turntable 45 pivots the pedestal 21, 22, 24 together with the measuring head 8 by 180°, the prism 52 and the bundle of measuring rays 56 are in the positions indicated in dotted lines (52' and 56'). With a measuring apparatus modified in this way, even an extremely highly stressed zone around the filling and emptying opening 2 can be inspected.

Figure 4B:
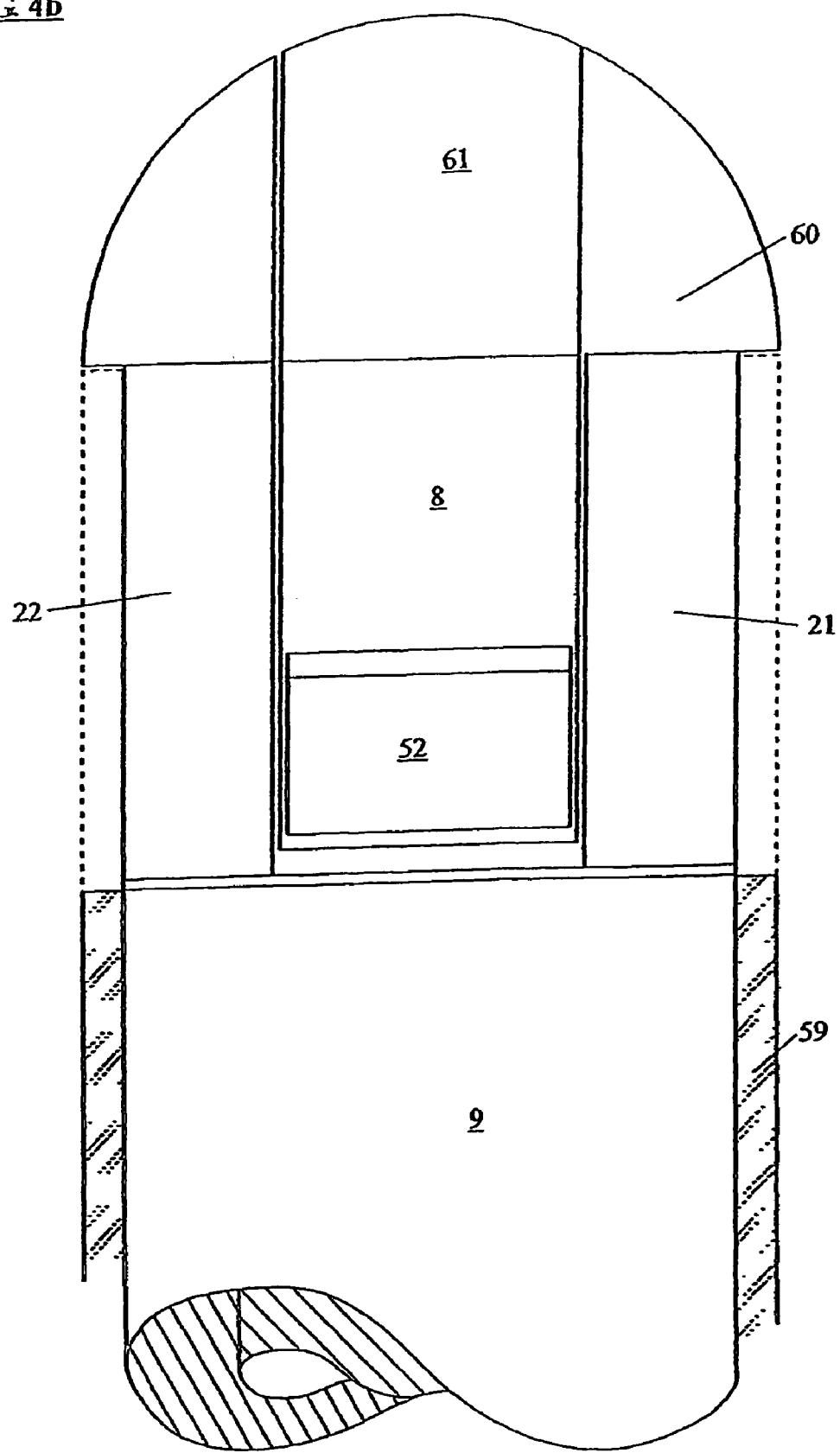
FIG. 4b is an exemplary lateral elevation.

The measuring apparatus can be stressed in several respects when used in steel works, particularly when measuring the lining of a torpedo ladle. First, there is a high working temperature of about 1300° C. which involves special measures. When introducing the measuring system into the ladle, a collision with the inner wall of the filling neck 2 can occur by which particles of steel, slag or lining from the wall can become loose and can soil the window 29 or the prism 52 and/or damage the whole measuring apparatus. In FIGS. 4a and 4b, a measuring apparatus is schematically shown, partially in cross-section, which is protected to a large extent against the above-mentioned risks during the critical phase of introducing into the interior of the torpedo ladle 1. Each one of the legs 21 and 22 is surrounded by a cooling jacket of meander-shaped formed small copper tubes 57. The cooling jacket is enveloped by an isolating layer 49 which, in turn, is surrounded by a sheet metal jacket 50. The pedestal 21, 22, 24 is mounted on the turntable 45 which is analogously cooled by small copper tubes 57 and is surrounded by an isolating layer 49. The turntable 45 is fastened to a flange 58 of the tube 10 which is also provided with a liquid cooling and an isolating layer. The cooled and isolated tube together with the turntable 45 is covered by a thin walled sheet metal tube 9.

A tube 59 is displaceably arranged over the tube 9 and the pedestal 21, 22, 24. In the inoperative position of the measuring system, this tube 59 assumes the position shown in FIG. 4a, while in operative position the tube 59 is withdrawn at least up to the turntable 45 (see FIG. 4b). By the control unit, the measuring head 8 is moved into the position shown in FIGS. 4a and 4b when the system is switched off. The tube 59 and the drive of the measuring head 8 are electrically locked against one another in such a manner that the measuring head can only be switched on when the tube 59 is withdrawn. Alternatively, when the drive of the measuring head is switched on although the tube is not withdrawn, a signal is emitted by a position sensor cooperating with the tube 59. In such a case, the signal of the sensor is either fed to an indicator which reminds the user to withdraw the tube 59, or the tube is displaced by a servo-motor automatically activated by the signal of the sensor until the tube assumes the withdrawn position.

As is particularly seen in FIG. 4b, the two legs 21 and 22 of the pedestal 21, 22, 24 are advantageously shouldered like steps in the plane 60. The free end of the legs 21 and 22 as well as the upper half 61 of the housing of the measuring head 8 are shaped as a semi-sphere. When introducing the measuring system into the torpedo ladle 1, the measuring head 8, is in the position shown in FIGS. 4a and 4b, the tube 59, according to FIG. 4a, is displaced in forward direction so that the sensitive measuring head 8 is protected to large extent. By the spherical shape of the free end of the measuring arrangement, introducing into the vessel, even with a very narrow opening, is substantially facilitated. The free end of the arrangement can also be shaped as a type of ellipsoid.

All lines to the measuring head, to the turntable 45 and to the coolers are lead by the cooled tube 9. The supply and return conduits for the cooling medium for the pedestal 21, 22, 24 and the turntable 45 are referenced 62, the control lines, energy lines and data lines to the measuring head 8 and the turntable 45 are referenced 63, the glass fiber cables to and from the measuring head are referenced 64. Position 65 denotes the supply conduit for the cooling medium to the cooling device for the tubes 9 or 10.

It will be appreciated appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An apparatus for recording an object space containing at least one object to be recorded, said apparatus comprising:
    opto-electronic range finder means including
        a transmitter unit for transmitting optical signals along an optical transmitter axis to be reflected by said object; and
        a receiver unit for receiving optical signals along an optical receiver axis after reflection by said object;
    scanning means for deviating the optical axes of said transmitter and receiver units, said optical axes of the transmitter and receiver units extending substantially in parallel;
    optical means for directing said optical transmitter signals towards said object and to direct said optical receiver signals to said receiver unit, said optical means including
        means forming a pedestal,
    hollow shaft means rotatably supported on said pedestal and defining an axis of rotation;
    a measuring head on said hollow shaft means for directing said optical transmitter signals towards said object and to obtain said optical receiver signals;
    mirror means arranged in a stationary fashion with respect to the measuring head, to deviate axially incident beams, in relation to the hollow shaft, in radial direction and vice-versa;
        wherein radiation of the stationary transmitter unit is lead in axial direction, in relation to the hollow shaft, and is transmitted in radial direction by said mirror means, while said optical receiver signals reflected from said object are deviated by said mirror means in the direction of said axis of rotation of said hollow shaft to be directed to said receiver unit which is also stationary arranged; and
    an evaluation unit coupled to said range finder means to compare said optical transmitter signals and said optical receiver signals to determine distance values from said delay and to convert them into corresponding data elements, said evaluation unit being also coupled to said scanning means so as to determine spatial coordinates of said individual data elements and the beam deviation of the scanning device.

2. Apparatus as claimed in claim 1, wherein said optical signals are laser signals and said transmitter unit comprises a laser.

3. Apparatus as claimed in claim 1, wherein said scanning means are adapted to scan in two orthogonal directions.

4. Apparatus as claimed in claim 1, comprising motor means for rotating said hollow shaft and said measuring head about said axis of rotation.

5. Apparatus as claimed in claim 1, wherein said mirror means are fixed within the measuring head in axial direction of said axis of rotation and comprise
 a first mirror for deviating said optical transmitter signals, which enter in axial direction through said hollow shaft, into a radial direction in relation to said axis of rotation, and
 a second mirror for deviating said optical receiver signals, which are substantially incident parallel to said optical transmitter signals, after reflection by said object, in axial direction in relation to axis of rotation and towards said receiver unit.

6. Apparatus as claimed in claim 5, comprising light guide means positioned after at least one of said first and second mirrors.

7. Apparatus as claimed in claim 5, comprising optical shaping means positioned in the path of light of at least one of said first and second mirrors for shaping said optical signals.

8. Apparatus as claimed in claim 7, wherein said optical shaping means comprise at least one lens.

9. Apparatus as claimed in claim 1, comprising a cooling arrangement for cooling at least one of said measuring head and said optical means including said pedestal.

10. Apparatus as claimed in claim 9, wherein said cooling arrangement comprises conduit means for supplying and discharging a cooling fluid.

11. Apparatus as claimed in claim 10, comprising tubular support means for supporting said pedestal, said tubular support means extending along a longitudinal axis, said conduit means comprising hose means extending within the interior of said tubular support means.

12. Apparatus as claimed in claim 11, wherein said conduit means are formed to convey a liquid cooling fluid.

13. Apparatus as claimed in claim 10, wherein said conduit means are formed to convey air under pressure, the pressurized air being introduced into said measuring head through one side of said hollow shaft means, and being discharged through the other side from it, said conduit means comprising a hose conduit in the interior of the tubular support means for supplying pressurized air, while the discharge is effected directly through said tubular support means.

14. An apparatus for recording the cavity of a vessel for an aggressive liquid, said apparatus comprising:
 opto-electronic range finder means including
  a transmitter unit for transmitting optical signals along an optical transmitter axis to be reflected by said object; and
  a receiver unit for receiving optical signals along an optical receiver axis after reflection by said object;
 scanning means for deviating the optical axes of said transmitter and receiver units, said optical axes of the transmitter and receiver units extending substantially in parallel;
 optical means for directing said optical transmitter signals towards said object and to direct said optical receiver signals to said receiver unit, said optical means including
  means forming a pedestal;
 hollow shaft means rotatably supported on said pedestal and defining an axis of rotation, said hollow shaft means being introduced into said vessel;
 a measuring head on said hollow shaft means for directing said optical transmitter signals towards said object and to obtain said optical receiver signals, while rotated by said hollow shaft means within said vessel;
 mirror means arranged in a stationary fashion with respect to the measuring head, to deviate axially incident beams, in relation to the hollow shaft, in radial direction and vice-versa;
  wherein radiation of the stationary transmitter unit is lead in axial direction, in relation to the hollow shaft, and is transmitted in radial direction by said mirror means, while said optical receiver signals reflected from said object are deviated by said mirror means in the direction of said axis of rotation of said hollow shaft to be directed to said receiver unit which is also stationary arranged;
 an evaluation unit coupled to said range finder means to compare said optical transmitter signals and said optical receiver signals to determine distance values from said delay and to convert them into corresponding data elements, said evaluation unit being also coupled to said scanning means so as to determine spatial coordinates of said individual data elements and the beam deviation of the scanning device.

15. Apparatus as claimed in claim 14, wherein said vessel is a molten metal receiving vessel comprising a lining.

16. Apparatus as claimed in claim 14, wherein said evaluating means comprise computing means for computing a three-dimensional image of said cavity.

17. Apparatus as claimed in claim 14, wherein said evaluating means comprise computing means for storing said distance values.

18. Apparatus as claimed in claim 17, wherein said computing means contain stored reference data to compare them with said determined distance values.

19. An apparatus for recording an object space containing at least one object to be recorded, said apparatus comprising:
 opto-electronic range finder means including
  a transmitter unit for transmitting optical signals along an optical transmitter axis to be reflected by said object; and
  a receiver unit for receiving optical signals along an optical receiver axis after reflection by said object;
 scanning means for deviating the optical axes of said transmitter and receiver units, said optical axes of the transmitter and receiver units extending substantially in parallel;
 optical means for directing said optical transmitter signals towards said object and to direct said optical receiver signals to said receiver unit, said optical means including
  means forming a pedestal having a predetermined outer pedestal contour,
 hollow shaft means rotatably supported on said pedestal and defining an axis of rotation;
 a measuring head on said hollow shaft means for directing said optical transmitter signals towards said object and to obtain said optical receiver signals, said measuring head having a predetermined outer head contour;
 mirror means arranged in a stationary fashion with respect to the measuring head, to deviate axially incident beams, in relation to the hollow shaft, in radial direction and vice-versa;
  wherein radiation of the stationary transmitter unit is lead in axial direction, in relation to the hollow shaft, and is transmitted in radial direction by said mirror means, while said optical receiver signals reflected from said object are deviated by said mirror means in the direction of said axis of rotation of said hollow shaft to be directed to said receiver unit which is also stationary arranged;

means forming a turntable pivotal about a pivoting axis extending perpendicularly to said axis of rotation, said pedestal being mounted on said turntable means; and an evaluation unit coupled to said range finder means to compare said optical transmitter signals and said optical receiver signals to determine distance values from said delay and to convert them into corresponding data elements, said evaluation unit being also coupled to said scanning means so as to determine spatial coordinates of said individual data elements and the beam deviation of the scanning device.

20. Apparatus as claimed in claim 19, comprising motor means for rotating said turntable means about said pivoting axis.

21. Apparatus as claimed in claim 19, wherein said measuring head comprises window means for leading said optical signals in and out of it.

22. Apparatus as claimed in claim 21, comprising deviating reflecting means arranged in front of said window means for deviating at least one of said optical signals in a substantially tangential direction in relation to said measuring head.

23. Apparatus as claimed in claim 19, wherein said contours, at least in inoperative position of said measuring head, are aligned so as to be flush with each other.

24. Apparatus as claimed in claim 23, wherein said two contours together form a rounded shape.

25. Apparatus as claimed in claim 24, wherein said two contours together form the shape of a spherical calotte.

26. An apparatus for recording an object space containing at least one object to be recorded, said apparatus comprising:
opto-electronic range finder means including
a transmitter unit for transmitting optical signals along an optical transmitter axis to be reflected by said object; and
a receiver unit for receiving optical signals along an optical receiver axis after reflection by said object;
scanning means for deviating the optical axes of said transmitter and receiver units, said optical axes of the transmitter and receiver units extending substantially in parallel;
optical means for directing said optical transmitter signals towards said object and to direct said optical receiver signals to said receiver unit, said optical means including
means forming a pedestal having a predetermined outer pedestal contour, hollow shaft means rotatably supported on said pedestal and defining an axis of rotation;
a measuring head on said hollow shaft means for directing said optical transmitter signals towards said object and to obtain said optical receiver signals, said measuring head having a predetermined outer head contour;
mirror means arranged in a stationary fashion with respect to the measuring head, to deviate axially incident beams, in relation to the hollow shaft, in radial direction and vice-versa;
wherein radiation of the stationary transmitter unit is lead in axial direction, in relation to the hollow shaft, and is transmitted in radial direction by said mirror means, while said optical receiver signals reflected from said object are deviated by said mirror means in the direction of said axis of rotation of said hollow shaft to be directed to said receiver unit which is also stationary arranged;

means forming a turntable pivotal about a pivoting axis extending perpendicularly to said axis of rotation, said pedestal being mounted on said turntable means;

tubular support means extending along a longitudinal axis, said turntable means being mounted on said tubular support means, wherein said pivoting axis is oriented in the same direction as that of said longitudinal axis; and an evaluation unit coupled to said range finder means to compare said optical transmitter signals and said optical receiver signals to determine distance values from said delay and to convert them into corresponding data elements, said evaluation unit being also coupled to said scanning means so as to determine spatial coordinates of said individual data elements and the beam deviation of the scanning device.

27. Apparatus as claimed in claim 26, wherein said pivoting axis is oriented parallel to that of said longitudinal axis.

28. Apparatus as claimed in claim 26, wherein said pivoting axis coincides with that of said longitudinal axis.

29. Apparatus as claimed in claim 26, wherein said pedestal and said measuring head in inoperative position, have diameters that are stepped towards said tubular support means, the apparatus further comprising tube means displaceable in longitudinal direction of said tubular support means, so as to be shifted over said stepped diameters in inoperative position, and to close said pedestal, said turntable means and said measuring head in a substantially tight manner.

30. Apparatus as claimed in claim 26, comprising carriage means, said tubular support means, said pedestal and said measuring head being arranged on said carriage means to be moved into at least one defined and reproduceable position relative to said object.

31. Apparatus as claimed in claim 26, comprising a cooling arrangement for cooling at least one of said tubular support means and said optical means including said pedestal.

32. Apparatus as claimed in claim 31, wherein said cooling arrangement comprises conduit means for supplying and discharging a cooling fluid to at least one of said tubular support means and said optical means including said pedestal.

33. Apparatus as claimed in claim 32, wherein said conduit means comprise hose means extending within the interior of said tubular support means.

34. Apparatus as claimed in claim 26, wherein said tubular support means are cylindrical.

35. An apparatus for recording an object space containing at least one object to be recorded, said apparatus comprising:
opto-electronic range finder means including
a transmitter unit for transmitting optical signals along an optical transmitter axis to be reflected by said object; and
a receiver unit for receiving optical signals along an optical receiver axis after reflection by said object;
scanning means for deviating the optical axes of said transmitter and receiver units, said optical axes of the transmitter and receiver units extending substantially in parallel;

optical means for directing said optical transmitter signals towards said object and to direct said optical receiver signals to said receiver unit, said optical means including means forming a pedestal, hollow shaft means rotatably supported on said pedestal and defining an axis of rotation;

a measuring head on said hollow shaft means for directing said optical transmitter signals towards said object and to obtain said optical receiver signals;

mirror means arranged in a stationary fashion with respect to the measuring head, to deviate axially incident beams, in relation to the hollow shaft, in radial direction and vice-versa;

wherein radiation of the stationary transmitter unit is lead in axial direction, in relation to the hollow shaft, and is transmitted in radial direction by said mirror means, while said optical receiver signals reflected from said object are deviated by said mirror means in the direction of said axis of rotation of said hollow shaft to be directed to said receiver unit which is also stationary arranged;

an evaluation unit coupled to said range finder means to compare said optical transmitter signals and said optical receiver signals to determine distance values from said delay and to convert them into corresponding data elements, said evaluation unit being also coupled to said scanning means so as to determine spatial coordinates of said individual data elements and the beam deviation of the scanning device; and a cooling arrangement for at least part of said optical means including said pedestal.

36. An apparatus for recording an object space containing at least one object to be recorded, said apparatus comprising:

opto-electronic range finder means including a transmitter unit for transmitting optical signals along an optical transmitter axis to be reflected by said object; and a receiver unit for receiving optical signals along an optical receiver axis after reflection by said object;

scanning means for deviating the optical axes of said transmitter and receiver units, said optical axes of the transmitter and receiver units extending substantially in parallel;

optical means for directing said optical transmitter signals towards said object and to direct said optical receiver signals to said receiver unit, said optical means including means forming a pedestal, hollow shaft means rotatably supported on said pedestal and defining an axis of rotation;

a measuring head on said hollow shaft means for directing said optical transmitter signals towards said object and to obtain said optical receiver signals;

mirror means arranged in a stationary fashion with respect to the measuring head, to deviate axially incident beams, in relation to the hollow shaft, in radial direction and vice-versa;

wherein radiation of the stationary transmitter unit is lead in axial direction, in relation to the hollow shaft, and is transmitted in radial direction by said mirror means, while said optical receiver signals reflected from said object are deviated by said mirror means in the direction of said axis of rotation of said hollow shaft to be directed to said receiver unit which is also stationary arranged;

an evaluation unit coupled to said range finder means to compare said optical transmitter signals and said optical receiver signals to determine distance values from said delay and to convert them into corresponding data elements, said evaluation unit being also coupled to said scanning means so as to determine spatial coordinates of said individual data elements and the beam deviation of the scanning device; and thermal insulating means for insulating at least one of a tubular support means and said optical means including said pedestal.

\* \* \* \* \*